(12) United States Patent
Hall et al.

(10) Patent No.: US 12,712,932 B2
(45) Date of Patent: Aug. 18, 2026

(54) COMMUNICATIONS SYSTEM AND METHOD FOR DELIVERING A LIVE MESSAGE TO RECIPIENTS

(71) Applicant: Mercury Acquisition 2021, LLC, Arlington, VA (US)

(72) Inventors: Matthew Hall, Park Ridge, IL (US); Vladimir Smelyansky, Glenview, IL (US)

(73) Assignee: MERCURY ACQUISITION 2021, LLC, Arlington, VA (US)

( * ) Notice: Subject to any disclaimer, the term of this patent is extended or adjusted under 35 U.S.C. 154(b) by 74 days.

(21) Appl. No.: 18/974,592

(22) Filed: Dec. 9, 2024

(65) Prior Publication Data

US 2025/0193261 A1 Jun. 12, 2025

Related U.S. Application Data

(60) Provisional application No. 63/607,462, filed on Dec. 7, 2023.

(51) Int. Cl.
*H04L 65/4038* (2022.01)
*H04L 65/60* (2022.01)

(52) U.S. Cl.
CPC .......... *H04L 65/4038* (2013.01); *H04L 65/60* (2013.01)

(58) Field of Classification Search
CPC ............................ H04L 65/4038; H04L 65/60
See application file for complete search history.

(56) References Cited

U.S. PATENT DOCUMENTS

| | | | | |
|---|---|---|---|---|
| 8,514,907 | B2 * | 8/2013 | Wright | H04H 60/64 463/40 |
| 2012/0324324 | A1 * | 12/2012 | Hwang | G11B 27/11 715/203 |
| 2015/0201161 | A1 * | 7/2015 | Lachapelle | H04N 7/15 348/14.07 |
| 2022/0214859 | A1 * | 7/2022 | El Ghazzal | G06F 3/165 |

* cited by examiner

*Primary Examiner* — Quang N Nguyen
(74) *Attorney, Agent, or Firm* — Edwards Neils LLC; Jean C. Edwards, Esq.

(57) ABSTRACT

The present invention relates to a live message delivery system, including: user and recipient communication devices; an interface device with display and accessed by the user; an interface server which controls the interface device and adapts the display of the interface device to a conference event; a conference dialer which establishes a first communication link with the recipient communication device; a conference device which multiplexes communication links from the recipient to the user communication device, enabling group communication; and a conference controller which initiates and manages the conference event to deliver a real-time message reading from the user to the recipient via communication links, manages the conference dialer to contact each participant, and allows the user to deliver the live message to the participants with a time offset between each reading by the users such that each of the participants receives the live message during the conference event.

30 Claims, 7 Drawing Sheets

COMMUNICATIONS SYSTEM AND METHOD FOR DELIVERING A LIVE MESSAGE TO RECIPIENTS

CROSS-REFERENCE TO RELATED APPLICATIONS

The present invention claims priority from U.S. Provisional Application No. 63/607,462, filed Dec. 7, 2023, the contents of which are herein incorporated by reference in their entirety.

BACKGROUND OF THE INVENTION

1. Field of the Invention

The present invention relates to a system and method of delivering live messages from a small number of agents to a large number of recipients.

2. Description of the Related Art

The state of the art of delivering live messages to a large number of participants suffers from a number of disadvantages. First, the large number of Agents required to deliver live messages comes with an exorbitant cost. Or the messages have to be delivered through impersonal means which may be prohibited by regulation, or unsatisfactory to the system users.

More specifically, methods such as Robocalls allow a prerecorded message to be delivered to a large number of recipients. However, delivering prerecorded messages to recipients in this manner is strongly restricted by regulations in some circumstances (for example, it is not permitted to deliver a prerecorded message to a cell phone without prior consent from the recipient).

Although Instant Messaging is an alternative, where messages may be sent to a large number of recipients simultaneously, these are considered to be prerecorded messages and are subject to the same regulatory restrictions as Robocalls.

Another existing method uses Live Agent Calls or Phone Banking—where the systems enable live Agents to read a message to a large number of recipients. However, the current state of the art only allows for a Live Agent to talk to one recipient at a time, which can be time consuming and/or costly when a message is to be delivered to a large number of recipients.

Finally, Webinars, Teleconferences, or Live Broadcasts, where messages may be delivered to a large number of recipients simultaneously, have disadvantages where, in trying to contact a large number of recipients, there may be a long delay between the first recipient joining the webinar or teleconference and the last recipient joining, meaning that the early recipients have to wait for all participants to join before they hear the message. Alternatively, the Agent broadcasting may read the message repeatedly as recipients join and leave.

Thus, a system which can solve for all the above drawbacks in live message applications, is desired.

SUMMARY OF THE INVENTION

The present invention relates to a system and method of delivering live audiovisual messages from a small number of agents to a large number of recipients.

The present invention solves for the drawbacks in the prior art by using a live, real-time, message reading instead of Robocalls and Instant Messaging and overcomes the drawback of Phone Banking by enabling a small number of agents in such a way that each individual agent delivers the live message to multiple recipients simultaneously. The present invention also solves for the disadvantages of Webinars, Teleconferences and Live Broadcasts by timing the broadcasts of multiple Agents such that each recipient receives a single reading of the visual message, no matter when they are joined to the conference.

In one embodiment a live message delivery system, includes: at least one user audiovisual device capable of receiving and transmitting at least one of audio or video; at least one recipient communication device capable of receiving and transmitting at least one of audio or video; an interface device having a processor with memory storage and a display and accessed by at least one user; an interface server having at least one processor, each processor including memory storage, the interface server which controls the interface device and adapts the display of the interface device to a conference event; a conference dialer which establishes a first communication link with at least one recipient communication device using a communication protocol; a conference device which multiplexes communication links from the at least one recipient communication device to the at least one user audiovisual device, enabling group communication; and a conference controller which initiates and manages the conference device to deliver a reading of a message in real-time from the at least one user to the at least one recipient, by establishing communication links between the at least one user and the at least one participant, manages the conference dialer to contact each of a plurality of participants, and allows the plurality of users to deliver a live message to the plurality of participants with a time offset between each reading by each of the plurality of users such that each of the plurality of participants receives the live message during a conference event.

In one embodiment, the system further includes: a first timer implemented by the conference controller, which instructs the first timer when to start and when to stop generating a signal.

In one embodiment, an interval between each signal generated by the first timer is predetermined during the configuration of the conference event based on a length of time required for a script by the user to be read.

In one embodiment, the system further includes: a second timer implemented by a reading control system of the conference controller, which controls reading speed.

In one embodiment, prior to the conference event being started, the script is received at the interface device and stored at the interface server.

In one embodiment, the conference controller stores contact information on the at least one recipient.

In one embodiment, the system further includes: an indicator system which indicates when the at least one user should read or stop reading the script of a message.

In one embodiment, the conference dialer initiates communications with the plurality of recipients over a predetermined period of time until all of the plurality of recipients have been contacted, unless a number of the plurality of users in a queue waiting for the conference event is less than a predefined limit; and initiation of additional connections with the plurality of recipients is paused until the number of the plurality of users in the queue is greater than or equal to the predefined limit.

In one embodiment, on condition that the conference dialer starts to initiate the communications with the plurality of recipients, the conference controller indicates to the interface device that reading may start.

In one embodiment, the reading is performed with the time offset generated by the first timer of a predetermined interval lasting a predetermined time period.

In one embodiment, the at least one user reads the script in predetermined time intervals triggered by the first timer, offset from the reading of the script by a previous user.

In one embodiment, the conference controller calculates the predetermined time interval between readings by the plurality of users.

In one embodiment, the conference controller ends the conference event after a predetermined amount of time, by at least one of terminating all communication links with the plurality of recipients or indicating to the plurality of users on the display using the indicator system, that each of the plurality of users is to stop reading.

In one embodiment, on condition that an answering machine is detected by the conference controller in contacting the plurality of recipients, the conference controller removes the communication link from the conference device and adds it to a different Conference when answering machine message recording is detected.

In one embodiment, an artificial intelligence engine is used to one of control the speed at which the message is read by the at least one user or implement a pause in the reading of the message by controlling the teleprompter on the display.

In one embodiment, a method of delivering a live message, includes: initiating conference event using a conference controller, which allows a connection from an audiovisual device of at least one user to the communication device of at least one participant in the conference event; establishing a first communication link using a conference dialer, between the at least one user and the at least one recipient using a communication protocol, enabling group communication; initiating and managing the conference event using a conference controller, to deliver a reading of a message in real-time from the at least one user to the at least one recipient, using communication links between the at least one user and the at least one participant; and allowing a plurality of users to deliver a live message to a plurality of participants with a time offset between each reading by each of the plurality of users such that each of the plurality of participants receives the live message during the conference event.

Thus, has been outlined, some features consistent with the present invention in order that the detailed description thereof that follows may be better understood, and in order that the present contribution to the art may be better appreciated. There are, of course, additional features consistent with the present invention that will be described below, and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

The description of the drawings includes exemplary embodiments of the disclosure and are not to be considered as limiting in scope.

DESCRIPTION OF THE INVENTION

The present invention relates to a system and method of delivering live audiovisual messages from a small number of agents to a large number of recipients.

In the present description, the configurations described below may be made on the basis of representative embodiments of the present invention, but the present invention is not limited to such embodiments.

Figure 1:
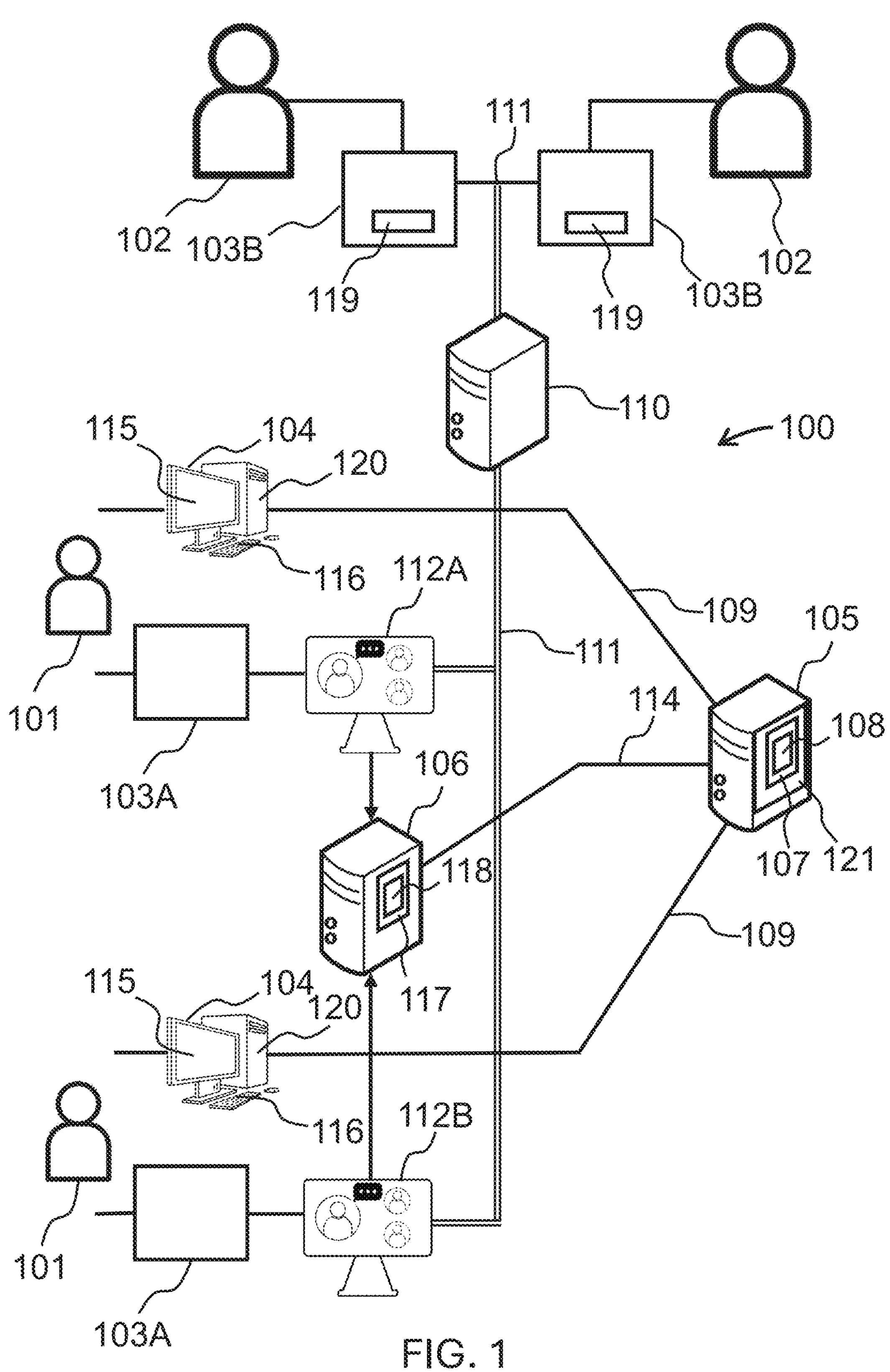
FIG. 1 is a diagram of the main components of the communications system, according to one embodiment consistent with the present invention.

Further, the present invention utilizes certain terms that describe certain features of the present communications system 100 (see FIG. 1), but the present invention is not limited to such specific terms or definitions.

Definitions

Agent: Any individual (e.g., Agent 101) participating in the communications system 100, which includes message delivery—particularly in the audio aspect. An Agent can be a general participant or a specific key speaker, such as a company's CEO or a Congressman.

Recipients: Individuals/Recipients 102 receive the message (i.e., Callees 102) through various communication mediums, including, but not limited to, phone, web, or other platforms supporting voice and/or video communications. Recipients must have a communication device 103B (described below), and the device 103B may be capable of multimedia communications, including, but not limited to a tablet, smartphone, or computer.

Event: The actual process of communication is an "Event".

Audiovisual Device: In one embodiment, an Audiovisual Device 103A is capable of receiving and/or transmitting audio and/or video. Agents 101 use Audiovisual Devices 103A for communication, and includes, but is not limited to a tablet, smartphone, or computer equipped with a camera and/or microphone.

Interface Device: In one embodiment, Agents 101 use an Interface Device 104 to access a user interface. Examples include, but are not limited to: smartphones, tablets, or computers, which may be accessed remotely by the Agent. In one embodiment, the Interface Device 104 may include a computer processor with memory storage and program 120 which runs the operations, and a display device 115 that is capable of providing high resolution digital images in 2-D or 3-D, for example.

In one embodiment, users may input commands to the user interface through a programmable stylus, keyboard, mouse, speech processing device, laser pointer, touch screen, or other input device or other selection device 116.

Each of the Interface Devices 104 facilitate interaction to the communication system 100 via a communication link 109 with the Interface Server 105. The Interface Device 104 and the Audiovisual Device 103A can be separate or integrated into a single unit.

Interface Server. In one embodiment, the Interface Server 105 may include at least one processor 121 which may be located on one or more machines 105. According to one embodiment, the processor 121 may have high processing capabilities and may have access to one or more storage devices (i.e., memory 107 or external storage) for storing programs 108 for providing various operations to the users. According to one embodiment, the Interface Server 105 may include a single unit or may include a distributed system having a plurality of servers 105, which may be shared by multiple users/Agents 101 in direct or indirect connection to each other. Although the above physical architecture has been described as having server components, one of ordinary skill in the art will appreciate that the components of the physical architecture may be located in either a client or a server, or in a distributed environment. The underlying technology allows for replication to various other sites. Each new site may maintain communication with its neighbors so that in the event of a catastrophic failure, one or more servers 105 may continue to keep the applications running, and allow the system to load-balance the application geographically as required.

In one embodiment, the Interface Server 105 controls what appears on the Agents' Interface Devices 104, adapting the display 115 based on the current state of the Event, and the actions of the Agent 101, as described below. In one embodiment, mechanisms that can be used by the Interface Server 105 to control the display 115 on Agents' Interface Devices 104 include, but are not limited to, sending HTML pages over HTTP to a web browser running on the Agent's Interface Device 104, or sending other data packets over HTTP such as JSON-formatted text which are received and processed by a software application running on the Agent's Interface Device 104.

Although the above-described features and processing operations may be realized by dedicated hardware or may be realized as programs having code instructions that are executed on data processing units, it is further possible that parts of the above sequence of operations may be carried out in hardware, whereas other of the above processing operations may be carried out using software.

Further, although aspects of one implementation of the invention are described as being stored in memory, one of ordinary skill in the art will appreciate that all or part of the invention may be stored on or read from other computer-readable media, such as secondary storage devices, like hard disks, floppy disks, CD-ROM, or other forms of ROM or RAM either currently known or later developed. Further, although specific components of the system have been described, one skilled in the art will appreciate that the system suitable for use with the methods and systems of the present invention may contain additional or different components.

Conference Dialer: In one embodiment, a Conference Dialer device 110 establishes communication links 111 with Recipients' communication devices 103B using a plurality of communication protocols. The Conference Dialer 110 can also transfer these communication links 111 to the Conference Device/Conference 112A, 112B.

Conference Device: In one embodiment, the Conference Device/Conference 112A, 112B multiplexes communication links 111 from multiple Recipients' communication devices 103B to a single Agent's Audiovisual Device 103A, enabling group communication.

Conference Controller: In one embodiment, the Conference Controller 113 manages the Conferences 112A, 112B. In one embodiment, the Conference Controller 106 initiates the Conference 112A, 112B to be used by the Agents 101 in conference with the participants. The Conference Controller 106 has the ability to initiate a communication link to an Agent's Audiovisual Device 103A, 103B and Interface Device 104, and can publish information to be provided to an Agent's Interface Device 104 that will allow an Agent 101 to initiate an audiovisual communication link 111 to the Conference 112A, 112B, terminate communication links to the Recipients 102, and detect when an Agent 101 disconnects from the Conference Device 112A, 112B.

In one embodiment, the Conference Controller 106 may include at least one processor which may have high processing capabilities and may have access to one or more storage devices (i.e., memory 117 or external storage) for storing programs 118 for providing various operations to the users. According to one embodiment, the Conference Controller 106 may include a single unit or may include a distributed system connected to one or more servers 105, which may be shared by multiple users/Agents 101 in direct or indirect connection to each other.

While the system 100 of the present invention may be described as performing certain functions, one of ordinary skill in the art will readily understand that the Conference Controller 106 and its program(s) 118 may perform the function rather than the entity of the system itself.

According to one embodiment of the invention, the program 118 that runs the system 100 may include separate programs having code that performs desired operations. According to one embodiment of the invention, the program 118 that runs the system 100 may include a plurality of modules that perform sub-operations of an operation or may be part of a single module of a larger program 118/108 that provides the operation.

Figure 2:
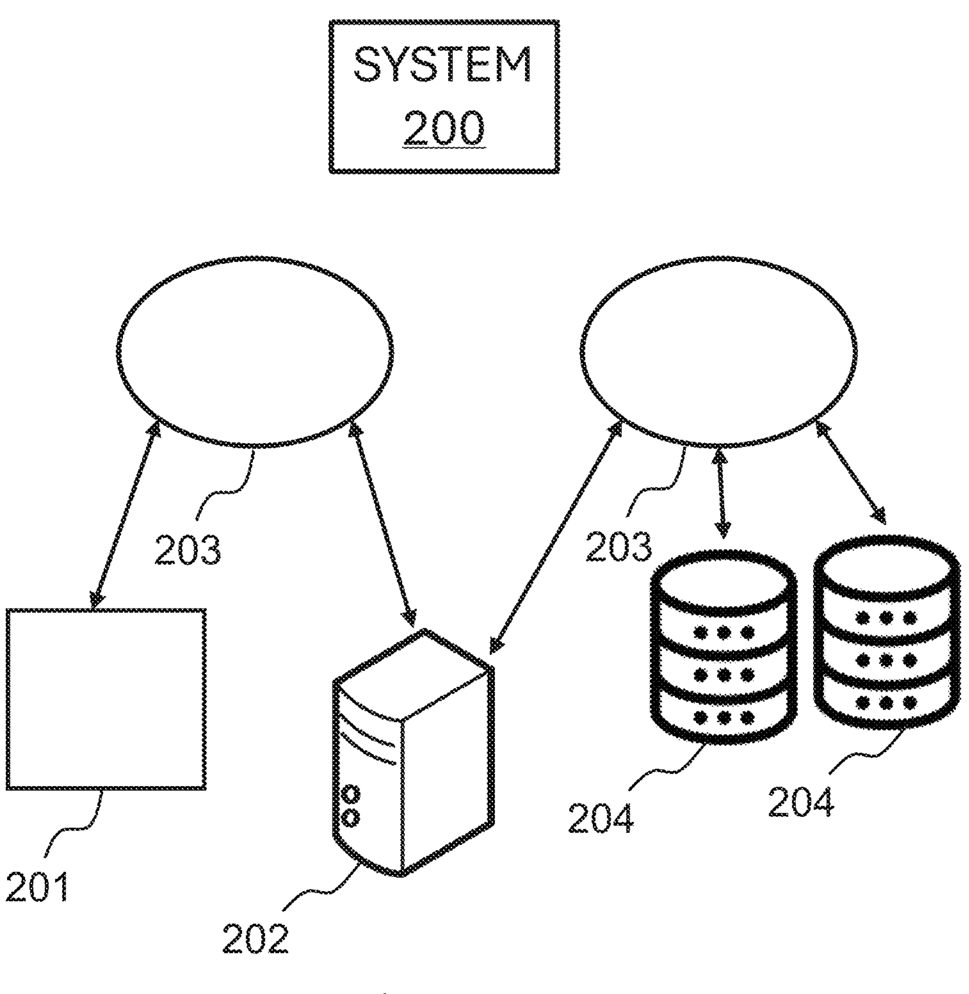
FIG. 2 is a diagram showing the main components of the communications system connected by a network or the internet, according to one embodiment consistent with the present invention.

According to one embodiment of the invention, in a client-server environment (see FIG. 2) of the system 200 of the present invention, at least one multimedia device such as a client computer 201 or Interface Device 201, and the Interface Server 202, are each coupled to a network, such as a Local Area Network (LAN), Wide Area Network (WAN), and/or the Internet 203, over a communication link (i.e., communication link 111).

In one embodiment, the communication link 111 may couple e-mail systems, fax systems, telephone systems 204 (i.e., carriers 1 and 2, such as AT&T or Verizon, etc.), multimedia wireless communications systems 103A such as pagers and cell phones, wireless PDAs, and other communication systems.

According to one embodiment of the invention, users may access the various information sources through secure and/or non-secure internet connectivity. Thus, operations consistent with the present invention may be carried out at the Interface Device 201, at the Interface Server 202, or both. The Interface Server 202 may be accessible by the client computer 201 or other multimedia device over the Internet 203, for example, using a browser application or other interface.

Queue: In one embodiment, a Queue signifies an ordered list of Agents 101 who have connected to the communication system 100 and indicated that they are ready to participate in the Event, as described below. In one embodiment, the ordering of the Agents 104 in the Queue can be determined by any criteria, as described below. In one embodiment, the Queue is a subcomponent of the Conference Controller 106.

Scripts: In one embodiment, Scripts are written text indicating the message to be delivered via the communication system 100. In one embodiment, one or a few scripts may be produced. In one embodiment, a Script could be a short introductory message with one or a few more detailed messages, or it could also be a single message.

Timers: In one embodiment, a first Timer is a component of the Conference Controller 106. In one embodiment, the Conference Controller 113 tells the first Timer when to start and when to stop generating a signal after the Event has ended. In one embodiment, the interval between signals is predetermined during the configuration of the Event based on the length of time needed to read the Scripts (see FIG. 4). In one embodiment, this signal is received by the Conference Dialer 110, the Conference Controller 113, and the Interface Server 105, and these components respond to this signal as described below.

In one embodiment, a second Timer at the client Interface Device 104 generates a signal (parts of a second or one or more) for setting Control Reading Speed (see flowchart of FIG. 5) (described below).

Preparation for a Conference

In one embodiment, prior to the Conference or an Event being started, Scripts should be written by an appropriate individual and inputted into the Interface Server 105 via a client computer such as the Interface Device 104.

In one embodiment, one or more Agents 101 should be ready to participate in the message delivery for the Conference.

In one embodiment, the contact information of the Recipients 102 should be inputted into the Conference Dialer by an Agent 101 from the Interface Device 104. In one embodiment, the contact information is provided in a manner appropriate to the communications protocol used by the Recipient's communication device 103B.

In one embodiment, if Participants 102 are expected to initiate connections to the Conference Dialer 110, contact information should be provided to them through email, text message, or any other appropriate mechanism. Alternatively, the contact information should be inputted and stored in memory 118 of the Conference Controller 106.

Message Delivery Operation

In step [001], in one embodiment, Agents 101 log in to the Interface Server 105 using their Interface Device 104 to indicate their readiness to participate in the live, real-time Event. In one embodiment, the login can be done from the web browser from any client device 104 that supports a web browser or from the communication device 103A (i.e., phone, tablet) over the phone interface or from the application or app from an appropriate device 103A. In one embodiment, the appropriate device can be a multimedia device 103A such as a smart phone, tablet, computer, or any similar equipment, which has the required application development and ability to interact over the network. In one exemplary embodiment, Microsoft Teams may be used as the application. In one embodiment, the login process may require username and password or even additional multifactor authorization.

In step [002], in one embodiment, after the Agent has logged in, the Interface Server 105 is notified by the Audiovisual Device 103A or Interface Device 104 using program 108.

In step [003], in one embodiment, the login triggers the Conference Controller 106 to initiate a unique Conference (i.e., Conference 112A, 112B) for that Agent 101. In one embodiment, the Conference can be like any of existing audio conferences or audiovisuals, such as those offered by Zoom, Teams, etc.

In step [004], in one embodiment, the contact information of the newly initiated Conference 112A, 112B is transmitted by the program 118 from the memory 117 of the Conference Controller 106 to the Interface Server 105, and the Interface Server 105 communicates with the Agent's Interface Device 104 so that this contact information for the Conference Event is displayed on the display 115 of their Interface Device 104. In one embodiment, this information allows the Agent 101 to initiate an audiovisual connection from their Audiovisual Device 103A to the newly created Conference 112A, for example.

Alternatively, in step [005], the Agent 101 may enter their contact information into the Interface Device 104, such that the Conference Controller 106 will have their contact information to call them to enter into the Conference 112A. Thus, the contact information is relayed by the program 120 to the Conference Controller 106, allowing the Conference Controller 106 to initiate an audiovisual connection between the Conference Device 112A and the Agent's Audiovisual Device 103A, for example.

Thus, in one exemplary embodiment, the Conference 112A may be initiated by the Conference Dialer 110, initiated by the Agent 101 based on information provided by the Interface Device 104, or provided by any other mechanism outside of the system 100 (i.e., other Conference Dialer 110).

In step [006], in one embodiment, the logged-in Agents 101 are placed into the Queue. In one embodiment, the order of the Queue could be based on the time of connecting, skill set of the Agent or some other predetermined criteria, like random order, or a combination of the above. In one embodiment, the logic of placing an Agent 101 into the Queue is similar to the logic utilized in Automatic Call Distribution Systems (ACD), and widely used today in different Call Center applications as well as in any PBX system on the market.

In one embodiment, additional Agents 101 can also join the Event in this manner at any time; when they do, they are placed into their own Audiovisual Conference and added to the Queue.

Figure 3:
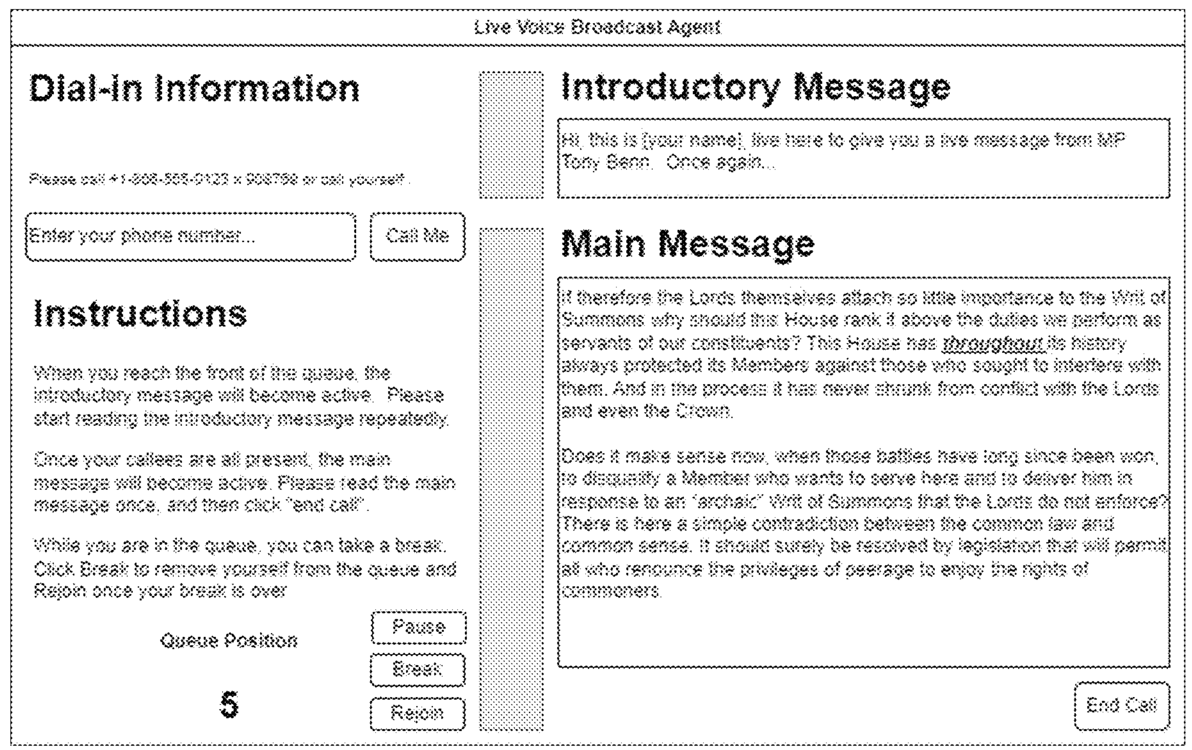
FIG. 3 is an exemplary display screen of a Conference Event, which shows the Dial-In Information, Instructions, Queue Position, the Introductory Message, with Break, Pause, Rejoin, and End Call buttons, according to one embodiment consistent with the present invention.

In step [007], in one embodiment, the Agent's Interface Device 104 displays on a display 115, a user interface (see FIG. 3) based on information provided by the Interface Server 105. An exemplary embodiment as shown in FIG. 3 provides the Dial-In Information, Instructions, Queue Position, the Introductory Message, which is repeated until all Callees 102 have joined, and then the Main Message which is read when all Callees 102 are listening. In one embodiment, this user interface allows the system 100 and the Agent 101 to interact with one another.

In one embodiment, while in the Queue, the Agent 101 may have a button (i.e., "Break"—see FIG. 3) providing the ability to temporarily leave the Queue (for example, to allow them to clear their throat or take a drink of water). Once they have finished their break, they can press the button again to "rejoin" the Queue (see FIG. 3). In one embodiment, a "Pause" button is also provided and is discussed below (see FIG. 3).

In one embodiment, there may be an indicator system (i.e., buttons, colors, or sounds, or other indicators) next to the Script(s) indicating when the Agents should read or stop reading the Script. In one embodiment, while the Agent 101 is in the Queue, all of the indicators may show a "halt" or "stop", and the Agent 101 is not expected to speak.

In step [008], in one embodiment, once a predetermined minimum number of Agents 101 have connected to their Conferences 112A, 112B, etc., the Conference Dialer 110 commences its dial out to message Recipients 102. Any incoming Recipients 102, that initiated communications with the Conference Dialer 110, themselves, will be moved to the active Conference at that point.

Figure 4:
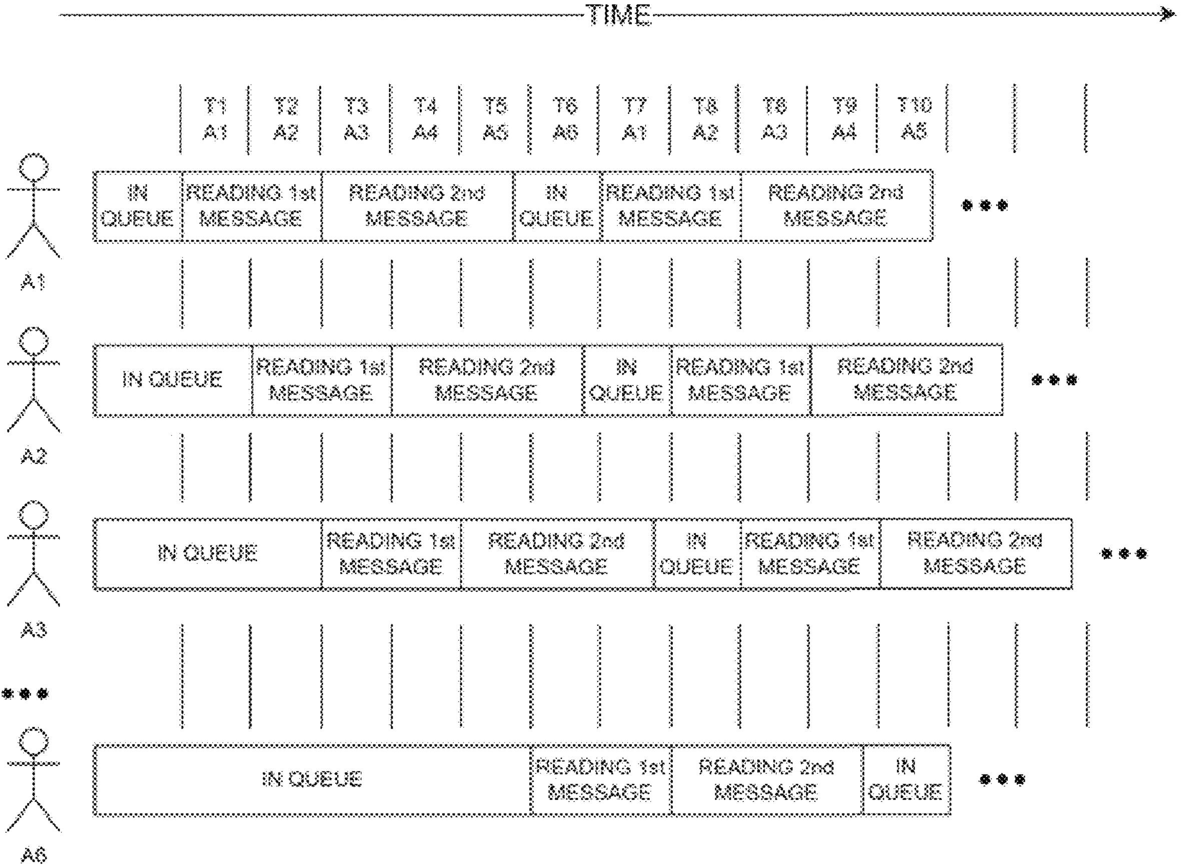
FIG. 4 is a diagram which shows how connected communications links are routed to the Agents' unique Conferences Devices etc., as the dialing progresses, and shows exemplary timings for six (6) Agents and two (2) messages, according to one embodiment consistent with the present invention.

In one embodiment, FIG. 4 shows how connected audiovisual communications links are routed to Agents' 101 unique Conferences 112A, 112B, etc., as the dialing progresses, and the actions of the Agents 101 over time. For illustrative purposes, the Example shown in FIG. 4 describes the timings for six (6) Agents and two (2) messages. Time intervals are shown as T1 to T10 (seconds).

In one embodiment, the Conference Dialer 110 continues to initiate communications with Recipients 102 over a period of time until all Recipients 102 have been contacted, unless the number of Agents 101 in the Queue is less than a predefined limit. In one embodiment, the limit could be any integer number. If this scenario occurs, in one embodiment, initiation of new connections with Recipients 102 is paused until the number of Agents 101 in the Queue is greater than or equal to the predefined limit.

In step [009], in one embodiment, as the Conference Dialer 110 starts to initiate connections with Recipients 102, and the Interface Server 105 may indicate to the Agent on their Interface Device 104 for the first Script go "green" or for reading to start, and the first Agent A1 in the Queue (see FIG. 4) should begin reading the first Script in a repeating fashion.

In step [010], in one embodiment, each Agent 101 reads the message Script with a time offset (see timing in FIG. 4) implemented by the first timer. In one embodiment, during the time interval T1 lasting Li seconds, any audiovisual communications links with Recipient's communications' devices 103B that are successfully established, may be added to the Agent's Conference 112A. In one embodiment, at any given time, successfully established communications links are only placed into one of the Agents' Conferences (i.e., 112A, 112B, etc.).

In one embodiment, if there is more than one Agent and more than one Script, after Li seconds, time interval T2 commences and the following events occur, triggered by a signal from the first Timer to various components as described below.

In step [011], in one embodiment, the Interface Server 105 communicates with the Interface Device 104 of the next Agent A2 (see FIG. 4) in the Queue. In one embodiment, this triggers their Interface Device 104 to indicate to the Agent (i.e., via a "green light" etc., on screen 115), that Agent A2 should start reading the first Script (i.e., Script 1). In one embodiment, any audiovisual communications links that are newly connected by the Conference Dialer 110 to Recipient's communications' devices 103B are added to Agent A2's Conference 112B, for example.

In step [012], in one embodiment, the Interface Server 105 communicates with the Interface Device 104 of Agent A1, triggering their Interface Device 104 to show a warning indicator or "yellow light" or other indicator, for Script 1 for Li seconds, before the indicator indicates a stop (i.e., "red light"). At the same time, Agent A1's Interface Device 104 shows an indicator (i.e., "green light") for Script 2. In one embodiment, this indicates that the Agent 1 is expected to read the complete first Script one more time, before proceeding to read the second Script, if there is one. In one embodiment, this method ensures that all Recipients 102 connected to Agent A1's Conference 112A hear the complete introductory Script at least once.

In one embodiment, the Agents also can be separated in such a way that some Agents read only the first Script when others read the second, for example.

In step [013], in one embodiment, after another Li seconds, time interval T3 begins and this process repeats, with a third Agent A3 starting to read the first Script, newly connected communications links between the Conference Dialer 110 and Recipient's communications' devices 103B being added to Agent A3's Conference 112C (not shown), and Agent A2 reading the introductory Script one more time before proceeding to the second Script. This process repeats for the duration of the Event.

Thus, in one embodiment, if the message is really long, there could be five-six speakers/Agents starting to read one after another. For example, if a message is 15 seconds long and there are 5 Agents/speakers, they will start reading with 3 second intervals one after the other. In one embodiment, the Participant 102 accepting the call will be placed to the Agent who is about to start reading. In that case the "Start" message should be coming from the centralized Conference Controller 106 since it is the only centralized location which knows how many speakers/Agents there are, and the Controller 106 is required to distribute the load appropriately.

In one embodiment, the Conference Controller 106 also should communicate when the Agent/speaker starts reading and performs the calculations (15 sec/5 agents=3 sec). In that case the maximum wait interval before a customer hears the audio would be up to 3 seconds. FIG. 4 shows that after the Agent finishes reading, the Agent may stay in the Queue for a short time before starting reading again.

In step [014], in one embodiment, when an Agent has finished reading the final Script, they will stop talking and push a "button" (or implement another indicator) on their Interface Device 104, which triggers a message to be sent from their Interface Device 104 to the Interface Server 105 to indicate that they have finished. In one embodiment, if the Agent is silent for a predetermined amount of time (i.e., two (2) seconds) without pushing the button, this is detected by the Conference Controller 106 and interpreted as the reading of the main message is completed. In one embodiment, at this time period, the following events occur:

In step [015], in one embodiment, the Conference Controller 106 terminates all communications links with any Recipients 102 in the individual Agent's Conference (i.e., 112A, or 112B, etc.).

In step [016], in one embodiment, the Interface Server 105 sends a message to that Agent's Interface Device 104, triggering all indicators on this Agent's screen to turn "red".

In step [017], in one embodiment, the Agent is added again to the Queue to await the instigation of a future Event.

Answering Machine Detection

In one embodiment, newly established communication links between the Conference Dialer 110 and Recipient's communications' devices 103B, as described above in steps and [009], for example, are treated as normal, however, the Conference Controller 106 starts running answering machine 119 detection on these audiovisual communication links in step [018].

In one embodiment, when connections are successfully established, the Conference Controller 106 will perform Answering Machine Detection on the communication stream transmitted from the recipient back to the Conference Event. In one embodiment, if an Answering Machine is detected on a given recipient's connection, the Conference Controller 106 removes that connection from active Conference 112A and treats it as if the connection is still in the process of being established. In one embodiment, once the Answering Machine Detection detects that the answering machine has started recording, the connection to that recipient is placed into the currently active Conference (which may be different from the Conference that the audiovisual connection was in prior to an answering machine being detected).

Reading Speed Control

In one embodiment, the speed at which the Agent reads the message may be controlled by a Reading Control System and program 118 of the Conference Controller 106 (e.g., a teleprompter). In one embodiment, in step [0121], the Reading Control System displays the message on the display 115 to be read, in one possible implementation of the initial screen, as shown in FIG. 5 in an exemplary embodiment.

In step [0122], in one embodiment, the Agent 101 can join the call by dialing in or by asking the message delivery system 100 to dial out, as described above. In one embodiment, after the Agent 101 is connected to the message delivery system 100, the Agent 101 can start the actual Event by clicking on the Start button (see FIG. 3) in step [0500].

Figure 5:
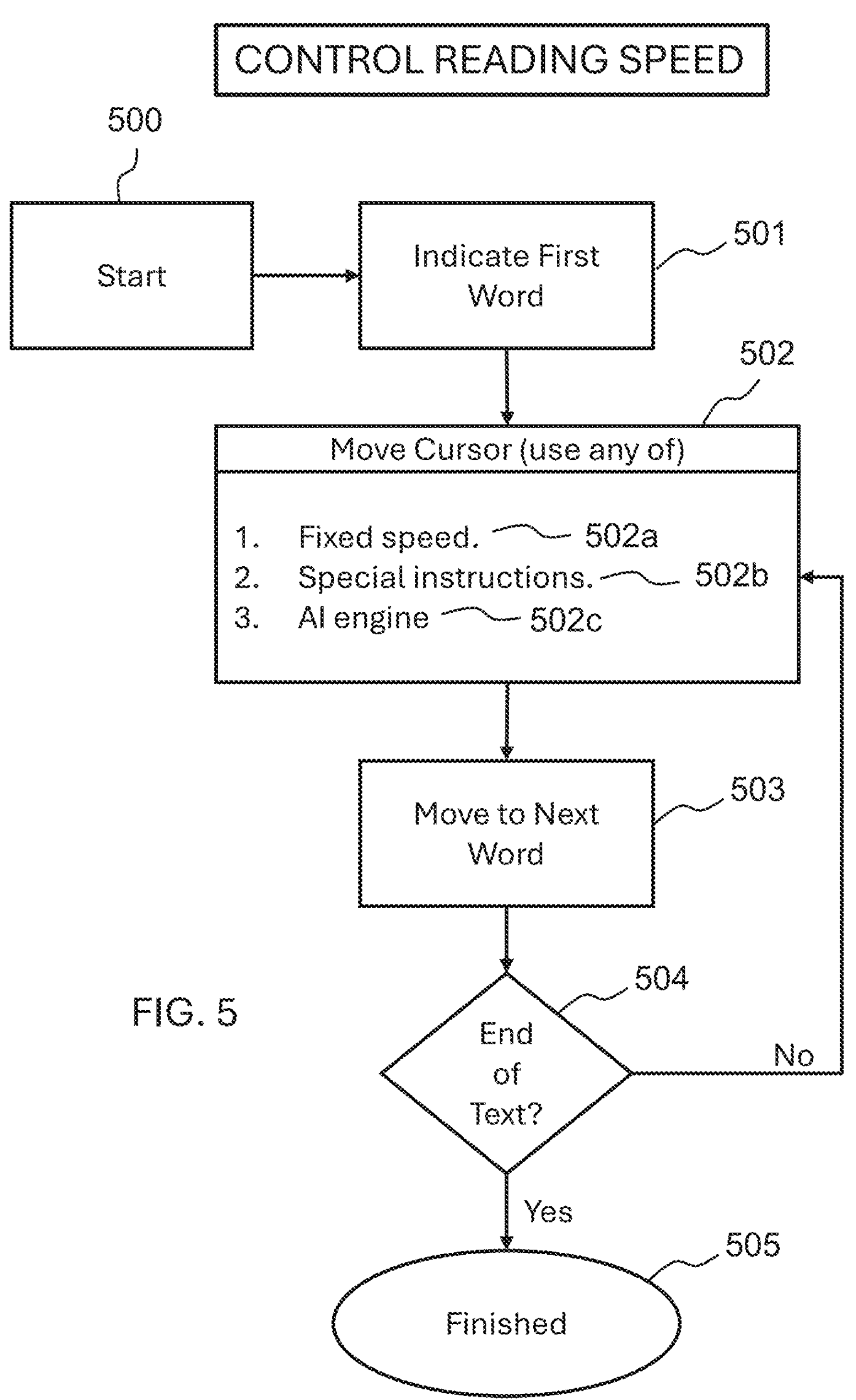
FIG. 5 is a flowchart showing the steps for setting Control Reading Speed of the Conference Controller of the live message delivery system, according to one embodiment consistent with the present invention.

After Event has started, in one embodiment, the display screen 115 is changed by the program 118 to that shown in FIG. 5 in step [0501], and to provide an actual reading position. Thus, in one embodiment, conference controller 106 instructions the Interface Device 104 as to which word on the display screen 115 should be read by the user (see FIG. 3) in step [0502].

In one embodiment, in step [0503], the speed at which the reading position is advancing can be controlled by the Agent 101, with inputted instructions to the Interface Device 104, which is then implemented by the Reading Control System of the Conference controller 106.

In one embodiment, in step [0502a], the Agent 101 could implement a fixed speed, such as 120 words per minute, or other comfortable speed for the Agent 101. In this case, the second timer at the Conference controller 106 is set to implement the speed as fixed in step [0502a] and move the cursor from word to word (or each word highlighted, for example), as in step [503]. For example, FIG. 3 shows the word "throughout" in bold/underline by the indicator system, as the word that is to be read next.

In one alternative embodiment, in step [502b], the preparation of teleprompt text can be implemented prior to the Event, where special computer instructions by the administrator(s) of the message delivery system 100 may be embedded into the original text directly or indirectly to be applied at specific points within the message.

For example, the actual text stored in memory 117/107 of the system 100 can have special instructions inserted into the text like HTML language. These special instructions will not be shown in the teleprompter (i.e., like on web pages—they are not shown). As an example, the actual text could be as follows:

A. Give a paw up to our furry friends! <pause>300</pause>Support our local animal shelter, B. <pause>200</pause>where every donation helps provide a safe haven, <pause>200</pause>medical care, <pause>200</pause>and love to those who need it most. <pause>300</pause>Join us in making a difference in their lives today.

In the example above, <pause>300</pause> means pause the teleprompter for 300 milliseconds.

In one embodiment, the same actual result can be achieved with special instructions, which could be provided in the separate file or database table at the Conference controller 106 or Interface Server 105. For example, to have a 300 millisecond pause after the $8^{th}$ word can be described as: "8,300 that document". In one embodiment, the preparation can be done by the administrator(s), Conference Controller 106, or an artificial intelligence (AI) Engine (i.e., programs 118 or 108), or any in combination, before the event starts.

In one embodiment, if there are no special instructions in step [0502b], a fixed reading control speed can be used by the Conference Controller 106 as in step [502a] by the Agent 101. Alternatively, in another embodiment, the pause or delay in the special instructions can be modified by the user or Agent 101, to a more comfortable reading speed.

In step [502c], in one alternative embodiment, the usage of Artificial Intelligence (AI) can be deployed by the Conference Controller 106 upon instruction by the Agent 101, to move the cursor, or highlight etc., from word to the next word, as in step [503]. In this embodiment, the AI Engine or system could consider the context of the message, such as the complexity of the words to be spoken, punctuation marks, and importance of the text.

The AI System also could accommodate the need to slow down or pause (see "Pause" button in FIG. 3) to give the Agent time to relax/recuperate. Note, that the Pause is a shorter in length than the Break, as in the Pause, the Agent 101 can continue reading, whereas the Agent 101 steps away for a longer period of time.

In one embodiment, the end of the Conference Event could be indicated to the Agent 101 by the conference controller 106 when all Agents 101 have completed their tasks. However, each Agent 101, when they have completed their individual reading or task, can implement an "End Call" in step [504], which appears on the display 115 as shown in FIG. 3.

In one embodiment, the Pause feature of the present invention is further described. In one embodiment, the display screen 115 shows that the Agent 101 may have control to Pause the teleprompter at any given time, for example, when the Agent 101 decides to take a Pause, or to deviate from the actual script or for some other reason. In one embodiment, the Conference Controller 106 could provide the Agent 101 the ability to stop the teleprompter without pausing the Conference Event itself.

Figure 6:
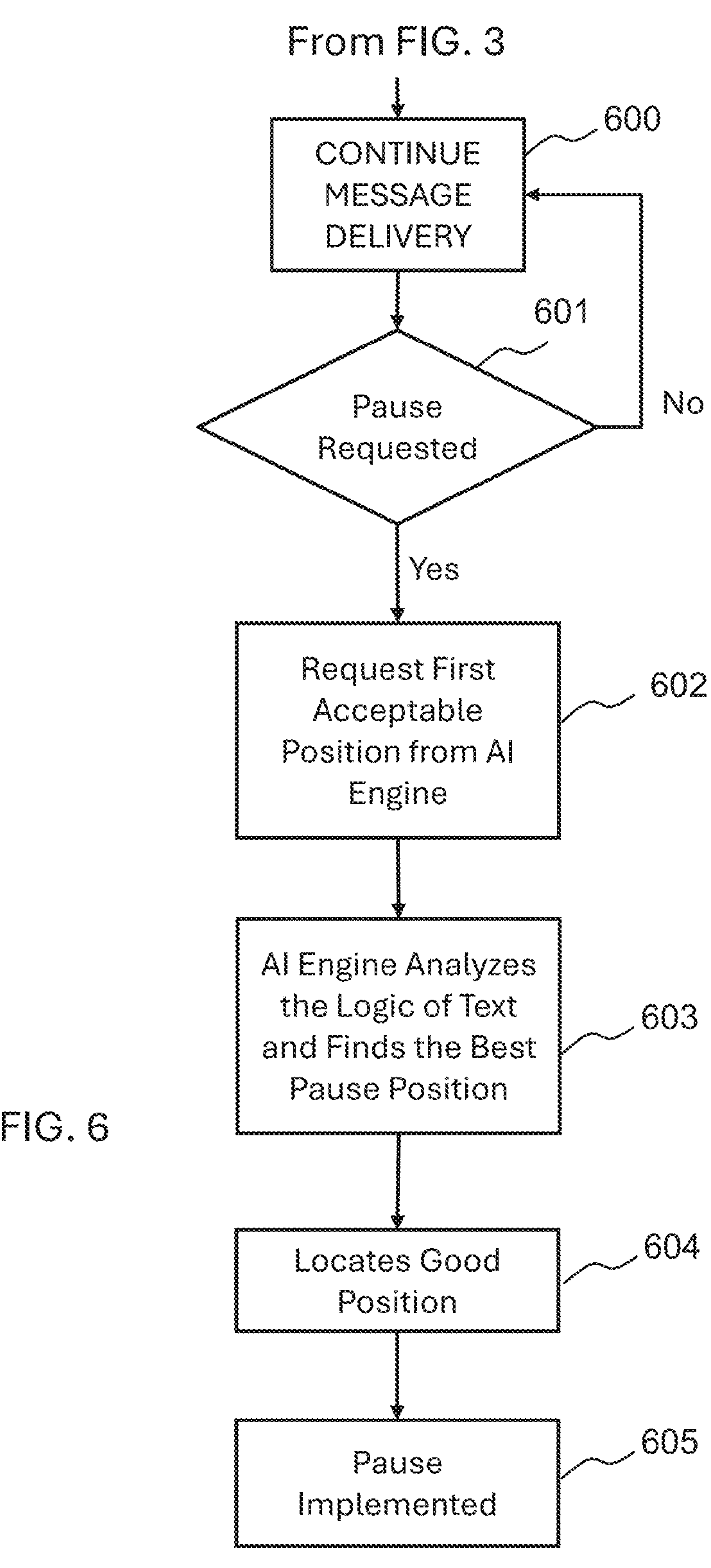
FIG. 6 is a flowchart of the steps for including a special, heuristic algorithm or an Artificial Intelligence (AI) Engine or system, or combination thereof, that can be used with the Conference Controller to "Pause" the message reading at the first "good" position, according to one embodiment consistent with the present invention.
Figure 7:
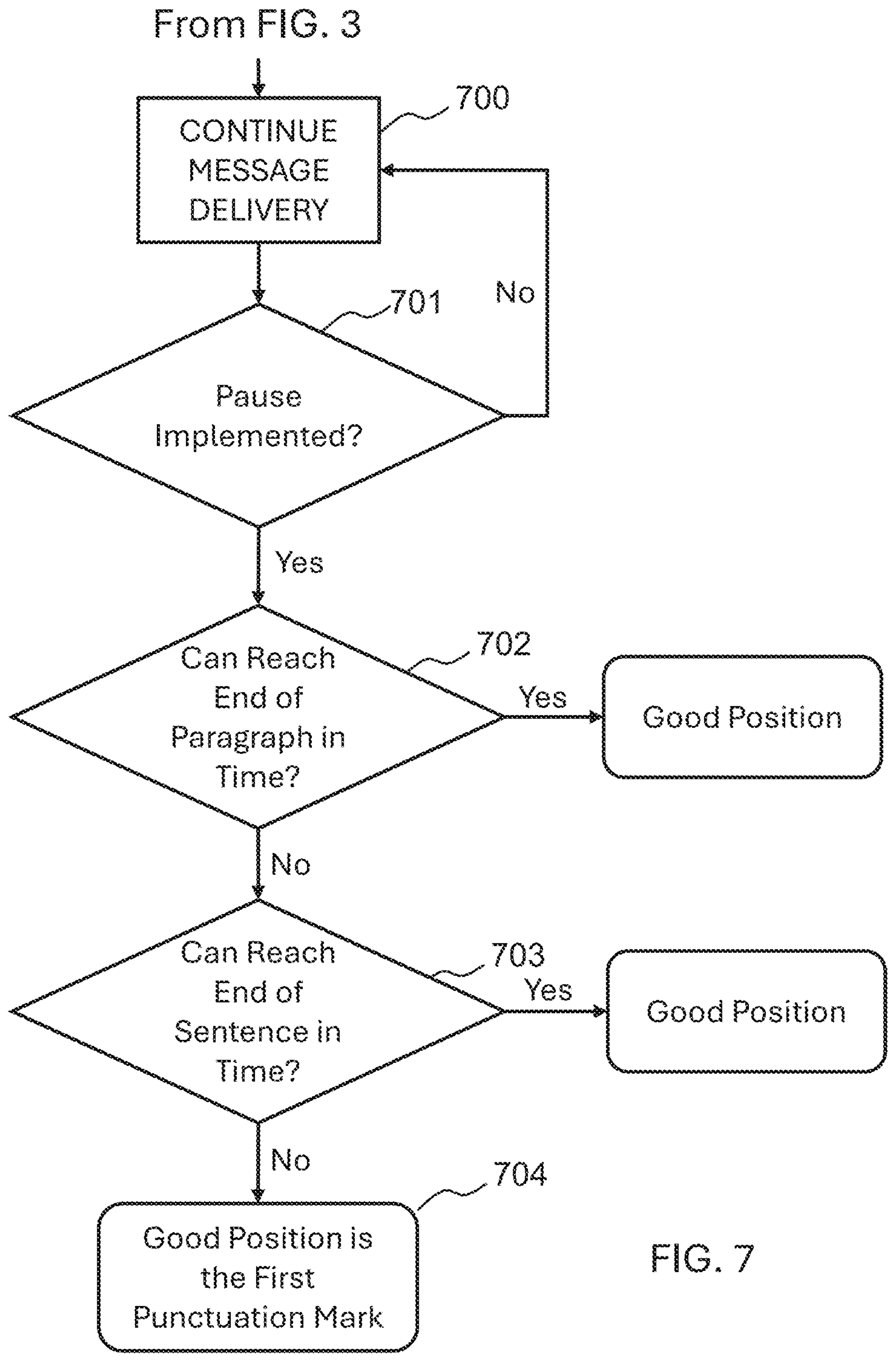
FIG. 7 is a flowchart of how the AI Engine of the Conference Controller locates a "good position" for a Pause, according to one embodiment consistent with the present invention.

In one embodiment, as shown in the flowchart of FIG. 6, a special, heuristic algorithm or an AI system, or combination, can be used with the Conference controller 106 to "Pause" the teleprompter at the first "good" place. In one exemplary embodiment, the steps by the program 118 to Pause the teleprompter in a "good" place could be implemented as shown in FIG. 7.

In one embodiment, during the Event and its live, real-time message delivery in step [0600], a request for a Pause is inputted to the AI Engine of the Conference controller 106 and/or Interface Device 104 in step [601].

In step [602], in one embodiment, the program 118 requests the first acceptable position from the AI Engine.

In step [603], the AI engine analyzes the logic of the text being read by the Agent 101 and finds the best Pause position based on a predetermined internal logic.

In one embodiment, in step [604], the AI Engine locates a "good position" for the Pause, and in step [605], the program 118 implements the Pause as shown in FIG. 6.

In one embodiment, FIG. 7 shows how the AI engine achieves the Pause. If the Agent 101 initiates a Pause during the message delivery of step [700], the AI Engine receives the instruction in step [701]. In one embodiment, the program 118 initiates the Pause at a Good Position predetermined by internal logical criteria.

In one embodiment, the program 118 determines whether the end of a paragraph can be reached within a predetermined time period, and if so, the program 118 initiates the Pause at a "Good" Position.

In one embodiment, if the end of a paragraph cannot be reached, the program 118 determines whether the end of a sentence can be reached, and if so, the program 118 initiates the Pause at a "Good" Position.

In one embodiment, if the end of the sentence cannot be reached, the program 118 initiates the Pause at the first punctuation mark (i.e., period).

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A live message delivery system, comprising:
- at least one user audiovisual device capable of receiving and transmitting at least one of audio or video;
- at least one recipient communication device capable of receiving and/or transmitting at least one of audio or video;
- an interface device having a processor with memory storage and a display and accessed by at least one user;
- an interface server having at least one processor, each processor including memory storage, the interface server which controls the interface device and adapts the display of the interface device to a conference event;
- a conference dialer which establishes a first communication link with the at least one recipient communication device using a communication protocol;
- a conference device which multiplexes communication links from the at least one recipient communication device to the at least one user audiovisual device, enabling group communication; and
- a conference controller which initiates and manages the conference device to deliver a reading of a message in real-time from the at least one user to the at least one recipient, by establishing communication links between the at least one user and the at least one recipient, manages the conference dialer to contact each of a plurality of recipients, and allows the plurality of users to deliver a live message to the plurality of recipients with a time offset implemented by a first timer which generates a signal providing a predetermined time interval between each reading by each of the plurality of users such that each of the plurality of recipients receives the live message during a conference event.

2. The system of claim 1, wherein the first timer instructs when to start and when to stop generating the signal.

3. The system of claim 2, wherein the predetermined time interval between each signal generated by the first timer is implemented during the configuration of the conference event based on a length of time required for a script by the user to be read.

4. The system of claim 3, further comprising:
- a second timer implemented by a reading control system of the conference controller, which controls reading speed.

5. The system of claim 4, wherein prior to the conference event being started, the script is received at the interface device and stored at the interface server.

6. The system of claim 1, wherein the conference controller stores contact information on the at least one recipient.

7. The system of claim 5, further comprising:
- an indicator system which indicates when the at least one user should read or stop reading the script of a message.

8. The system of claim 7, wherein the conference dialer initiates communications with the plurality of recipients over a predetermined period of time until all of the plurality of recipients have been contacted, unless a number of the plurality of users in a queue waiting for the conference event is less than a predefined limit; and
- wherein initiation of additional connections with the plurality of recipients is paused until the number of the plurality of users in the queue is greater than or equal to the predefined limit.

9. The system of claim 8, wherein on condition that the conference dialer starts to initiate the communications with the plurality of recipients, the conference controller indicates to the interface device that reading may start.

10. The system of claim 9, wherein the reading is performed with the time offset generated by the first timer of the predetermined time interval lasting a predetermined time period.

11. The system of claim 10, wherein the at least one user reads the script in predetermined time intervals triggered by the first timer, offset from the reading of the script by a previous user.

12. The system of claim 11, wherein the conference controller calculates the predetermined time interval between readings by the plurality of users.

13. The system of claim 12, wherein the conference controller ends the conference event after a predetermined amount of time, by at least one of terminating all communication links with the plurality of recipients or indicating to the plurality of users on the display using an indicator system, that each of the plurality of users is to stop reading.

14. The system of claim 1, wherein on condition that an answering machine is detected by the conference controller in contacting the plurality of recipients, the conference controller removes the communication link from the conference device and adds it to another conference when the answering machine message recording is detected.

15. The system of claim 13, further comprising:

an artificial intelligence engine which is used to one of control the speed at which the message is read by the at least one user or implement a pause in the reading of the message, by control of a teleprompter on the display.

16. A method of delivering a live message, comprising:

initiating a conference event using a conference controller, which allows a connection from an audiovisual device of at least one user to a communication device of at least one recipient in the conference event;

establishing a first communication link using a conference dialer, between the at least one user and the at least one recipient using a communication protocol, enabling group communication;

initiating and managing the conference event using a conference controller, to deliver a reading of a message in real-time from the at least one user to the at least one recipient, using communication links between the at least one user and the at least one recipient; and allowing a plurality of users to deliver a live message to a plurality of recipients with a time offset implemented by a first timer which generates a signal providing a predetermined time interval between each reading by each of the plurality of users such that each of the plurality of recipients receives the live message during the conference event.

17. The method of claim 16, further comprising: utilizing the first timer implemented by the conference controller, to start and to stop generating the signal after the conference event.

18. The method of claim 17, wherein the predetermined time interval between each signal generated by the first timer is implemented during the configuration of the conference event based on a length of time required for a script by the user to be read.

19. The method of claim 18, further comprising:

implementing a reading control system using a second timer of the conference controller which controls reading speed.

20. The method of claim 19, wherein prior to the conference event being started, the script is received at the interface device and stored at the interface server.

21. The method of claim 20, wherein the conference controller stores contact information on the at least one recipient.

22. The method of claim 20, further comprising:

indicating, using an indicator system, when the at least one user should read or stop reading a script of a message.

23. The method of claim 22, wherein the conference dialer initiates communications with the plurality of recipients over a predetermined period of time until all of the plurality of recipients have been contacted, unless a number of the plurality of users in a queue waiting for the conference event is less than a predefined limit; and wherein initiation of additional connections with the plurality of recipients is paused until the number of the plurality of users in the queue is greater than or equal to the predefined limit.

24. The method of claim 23, wherein on condition that the audiovisual dialer starts to initiate the communications with the plurality of recipients, the conference controller indicates to the interface device that reading may start.

25. The method of claim 24, wherein the reading is performed with the time offset generated by the first timer of the predetermined time interval lasting a predetermined time period.

26. The method of claim 25, wherein the at least one user reads the script in predetermined time intervals triggered by the first timer, offset from the reading of the script by a previous user.

27. The method of claim 26, wherein the conference controller calculates the predetermined time interval between readings by the plurality of users.

28. The method of claim 27, wherein the conference controller ends the conference event after a predetermined amount of time, by at least one of terminating all communication links with the plurality of recipients or indicating to the plurality of users on the display using the indicator system, that each of the plurality of users is to stop reading.

29. The method of claim 16, wherein on condition that an answering machine is detected by the conference controller in contacting the plurality of recipients, the conference controller removes the communication link from the conference device.

30. The method of claim 25, wherein an artificial intelligence engine is used to one of control the speed at which the message is read by the at least one user or implement a pause in the reading of the message by control of a teleprompter on the display.

* * * * *